United States Patent Office 3,351,598
Patented Nov. 7, 1967

3,351,598
2-BENZOYL-PIPERAZINES
Anthony M. Akkerman, Geertruida C. van Leeuwen, and Josephus F. Michels, Amsterdam, Netherlands, assignors to N.V. Nederlandsche Combinatie Voor Chemische Industrie, Amsterdam, Netherlands, a limited liability company of the Netherlands
No Drawing. Filed Nov. 3, 1965, Ser. No. 506,269
1 Claim. (Cl. 260—268)

This invention relates to new piperazine derivatives and to methods of preparing them.

This is a continuation-in-part of our application Serial Number 269,900 filed April 2, 1963, now abandoned.

In the U.S. Patents 2,958,693 and 3,056,786 piperazinone derivatives containing carbon-attached side chains are described to be useful intermediates in the preparation of valuable pharmaceutical products.

In both specifications it has further been sketchy indicated that the compounds described can be converted by three consecutive reactions into compounds of the formula:

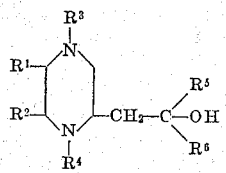

in which $R^1$, $R^2$, $R^3$, $R^4$ are alkyl or aralkyl groups or hydrogen, $R^5$ is alkyl or aryl and $R^6$ is phenyl, pyridyl or the like. These compounds, of which not a single one is really described, are said to possess spasmolytic and antihistaminic properties.

In an article of H. E. Zaugg et al., J.A.C.S., 80, 2773 (1958), published after the priority date of the above mentioned U.S. patents, the authors describe some tertiary carbinols of the piperazine series. In their article they state that a.o. compounds according to the formula:

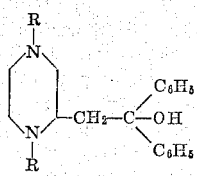

in which R is hydrogen or methyl are practically inactive as regards spasmolytic effects and that none of the compounds described showed more than minimal activity in an anti-Pakinsonism test.

By testing compounds according to the formula:

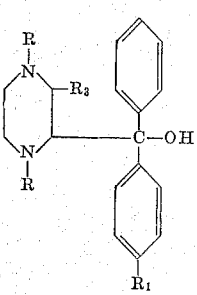

in which R is selected from the group consisting of hydrogen, benzyl and methyl, $R_3$ is selected from the group consisting of hydrogen, methyl and ethyl and $R_1$ is selected from the group consisting of hydrogen, fluorine and chlorine, it has been found that these piperazine derivatives do not possess antihistaminic properties, not even at concentrations 30 times as large as those concentrations of diphenhydramine and pyrilamine which show in the same test most satisfactory antihistaminic activity. Moreover, it has appeared that the above compounds do not possess spasmolytic properties. On the other hand, the piperazine derivatives according to the above formula show a distinct activity on the central nervous system. The activity found is of a stimulating nature for compounds in which R is hydrogen or methyl and of a depressing nature for compounds in which R is benzyl. It will be clear that these effects are in no way predictable on the ground of the, in some respect contradictory, literature mentioned before. The new compounds according to the invention can be prepared by several methods known per se. In case $R_1$ is hydrogen, principally two methods may be employed, viz.:

(1) Reaction of a sufficient excess of phenylmagnesiumhalide with an ester of a piperazine-2-carboxylic acid of the formula:

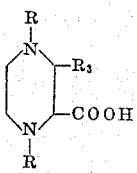

in which R and $R_3$ have the above defined meanings, followed by hydrolyzing the Grignard adduct obtained, and, if desired, in case R represents a hydrogen atom, substituting the same by benzyl or methyl in a manner known per se.

(2) Reaction of an ester of a 2,3-dihalogen-propionic acid of the formula

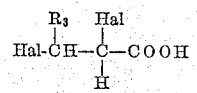

with an ethylenediamine derivative of the formula

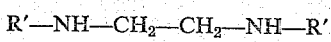

R'—NH—CH₂—CH₂—NH—R' in which formulae $R_3$ has the above defined meaning, Hal represents a halogen atom, and R' represents a methyl or benzyl group, followed by reaction of the N,N'-disubstituted piperazine-2-carboxylic acid ester obtained with phenylmagnesium halide in the proportion of at least 2 moles of phenylmagnesium halide to 1 mole of the ester, and, if desired, by replacement of R' by R in a suitable manner known per se. In those cases where $R_1$ is other than hydrogen, a third method of synthesis is used in which 2-benzoyl piperazines instead of piperazine-2-carboxylic esters are the intermediates:

(3) Reaction of an α,β-dihalopropiophenone of the formula

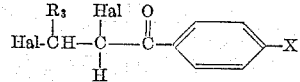

with an ethylenediamine derivative of the formula

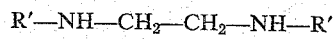

R'—NH—CH₂—CH₂—NH—R' in which formulae R', $R_3$ and Hal have the above defined meanings and X is hydrogen, fluorine or chlorine.

Hereafter the 2-benzoyl piperazine obtained, having the formula

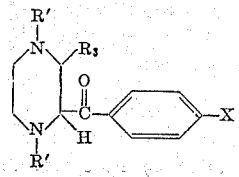

is submitted to a Grignard reaction with, for each mole of the ketone, at least 1 mole of a phenylmagnesium halide of the formula

in which X′ is hydrogen in case X is fluorine or chlorine, and fluorine or chlorine in case X is hydrogen, thus affording the carbinol of the formula

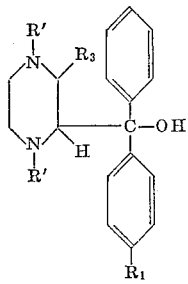

Finally, both groups R′ may be replaced by R in a suitable manner known per se.

The following examples only serve to illustrate the invention. Variations will be apparent to one skilled in the art.

*Example 1*

To 1.7 grams of magnesium chips in 20 ccs. of ether and a trace of iodine there are added dropwise 11.4 grams of bromobenzene in 30 ccs. of ether over a period of 20 minutes and during calm boiling of the ether.

After completion of the addition, the mixture is refluxed for another 15 minutes. After cooling to about 20° C. 1.7 grams of piperazine-2 carbonic acid methylester in 20 ccs. of ether are added slowly dropwise during continuous stirring. The reaction mixture is decomposed by addition of dilute hydrochloric acid, whereupon the ether layer is separated and the acidic aqueous layer is made alkaline with dilute ammonia. The base formed is taken up in ether and the ether is evaporated after drying. The crystalline residue is recrystallized from ether. The melting point of the 2(α-hydroxybenzhydryl)-piperazine thus obtained is 172°–174° C.

*Example 2*

While being continuously stirred, a mixture of 89.4 grams of N,N′-dibenzylethylenediamine, 59 grams of 2,3-dichloropropionic acid methylester, 108 grams of potassium carbonate, 75.5 grams of sodium iodide and 1000 ccs. of 2-ethoxyethanol is refluxed for 4 hours, keeping the bath-temperature at 135°–140° C. After cooling, the inorganic material is filtered and the filtrate is evaporated in vacuo. The residue is distributed between water and benzene.

The benzene layer is washed once with 4 N solution of sodium hydroxide and dried with solid potassium carbonate, after which the solvent is removed. The residue is dissolved in methanol and treated with concentrated hydrochloric acid. A slight precipitate of unreacted N,N′-dibenzylethylenediamine dihydrochloride results, which precipitate is filtered off. Further the methanol is evaporated and the 1,4-dibenzylpiperazine 2-carbonic acid methylester dihydrochloride is recrystallized from acetone. The dihydrochloride obtained contains 1½ moles of water of crystallization and melts at 164°–165° C.

4 N sodium hydroxide solution is added to an aqueous solution of this dihydrochloride until the basic reaction remains, and the free base is extracted with 300 ccs. of ether. After careful drying, the etheric solution obtained is added dropwise and very slowly (over a period of 2½ hours) to a refluxing Grignard solution prepared from 39.2 grams of bromobenzene and 6 grams of magnesium. After completion of the addition, boiling is continued for another hour. Thereafter, the cooled reaction mixture is decomposed by a 10% ammonium chloride solution, the ether layer is separated and the aqueous layer is twice extracted with ether. After drying and evaporation of the ether, the residue is recrystallized from a little ethanol. The 1,4-dibenzyl-2-(α-hydroxybenzhydryl)-piperazine thus obtained melts at 118°–120° C.

Starting from the ethylesters of 2,3-dichlorobutyric- and 2,3-dichlorovaleric acid respectively, the following compounds were synthesized in the same manner:

1,4-dibenzyl-3-methyl-2-piperazinecarboxylic acid ethylester (dihydrochloride M.P. 202°–204° C.), 1,4-dibenzyl-3-ethyl-2-piperazinecarboxylic acid ethylester (dihydrochloride M.P. 180° C.), 1,4-dibenzyl-3-methyl-2(α-hydroxybenzhydryl)-piperazine M.P. 120°–123° C. (dihydrochloride M.P. 208°–212° C.), 1,4-dibenzyl-3-ethyl-2(α-hydroxybenzhydryl) - piperazine (dihydrochloride M.P. 178°–179° C.).

*Example 3*

To a well stirred mixture of 41 grams of N,N′-dibenzyl ethylenediamine, 49 ccs. of triethylamine and 150 ccs. of benzene, a solution of 32.4 grams of dichloropropiophenone in 100 ccs. of benzene is slowly added. Initially the temperature of the mixture is kept at 20°–25° C. by external cooling with ice water. Stirring is continued at room temperature for 16 hours.

The precipitate of triethylamine hydrochloride is filtered and the filtrate is washed with water, dried with potassium carbonate and evaporated in vacuo. The residue is dissolved in methanol. Some unreacted N,N′-dibenzyl-ethylenediamine separates as the sparely soluble dihydrochloride which is removed by filtration. The filtrate is evaporated in vacuo and the residue taken up in acetone. The product separates as a crystalline precipitate; 1,4-dibenzyl-2-bonzoyl-piperazine dihydrochloride, M.P. 295° C. 4 N sodium hydroxide solution is added to an aqueous solution of this dihydrochloride until the basic reaction remains, and the free base is extracted with 300 ccs. of benzene. The solvent is evaporated in vacuo and 9.2 grams of the remaining base are dissolved in 50 ccs. of dry benzene. This solution is added to a Grignard reagent prepared from 0.8 gram of magnesium, 5.8 grams of p-chloro-bromobenzene and 50 ccs. of absolute ether. The ether is removed by distillation and the remaining mixture refluxed for 3 hours. Thereupon, after cooling, the Grignard complex is decomposed by a 10% ammonium chloride solution. The benzene layer is washed with water, dried, and evaporated, leaving a residue which crystallizes upon addition of light petrol. The 1,4-dibenzyl-2-(α - hydroxy-α-p-chlorophenyl)-benzyl-piperazine is recrystallized from methanol and melts at 125°–127° C.

If, in the above example, p-chlorobromobenzene is substituted by bromobenzene, p-fluorobromobenzene and p-bromotoluene respectively, the following substances are obtained:

1,4-dibenzyl-2-(α-hydroxy-benzhydryl) - piperazine, M.P. 118°–120° C., 1,4-dibenzyl-2-(α-hydroxy-α-p-fluorophenyl)-benzyl - piperazine, M.P. 98°–99° C., 1,4-dibenzyl-2-(α-hydroxy-α-p-tolyl)-benzyl - piperazine, MP. 120°–125° C.

*Example 4*

A solution of 18.4 grams of 1,4-dibenzyl-2-(α-hydroxybenzhydryl)-piperazine in 225 ccs. of 95% ethanol is hydrogenated at an excess pressure of 4–5 atm. after the addition thereto of the equivalent amount of concentrated hydrochloric acid (7 ccs.) and 5 grams of a catalyst (palladium, 5% on bariumsulfate).

After absorption of the theoretical amount of hydrogen at 90° C. (in about 1½ hours), the mixture is cooled, the catalyst filtered off and the filtrate evaporated under reduced pressure. The residue is recrystallized from methanol. The melting point of the 2-(α-hydroxybenzhydryl) piperazine dihydrochloride (with two moles of water of crystallization) thus obtained is now 305° C. under decomposition. Catalytic debenzylation, in a similar manner, of the 1,4-dibenzyl piperazine derivatives described in the foregoing examples, affords the following substances:

3-methyl-2-(α-hydroxybenzhydryl)-piperazine M.P. 187°–191° C. (dihydrochloride, M.P. 327°–329° C.), 3-ethyl-2-(α-hydroxybenzhydryl)-piperazine M.P. 147°–148° C. (dihydrochloride, M.P. 317°–322° C.), 2-(α-hydroxy-α-p-chlorophenyl)-benzylpiperazine - dihydrochloride, M.P. 313°–315° C., 2-(α-hydroxy-α-p-fluorophenyl)-benzyl-piperazine - dihydrochloride, M.P. 287°–289° C.

*Example 5*

To 3.8 grams of 2-(α-hydroxybenzhydryl)-piperazine dihydrochloride (with two moles of water of crystallization) are added 5.4 grams of formaldehyde solution, 8 grams of 98–100% formic acid and 1.4 grams of sodium formate, and the mixture obtained is refluxed for 19 hours. After cooling, the reaction mixture is made alkaline and extracted with ether. The etheric solution is dried and the ether evaporated, whereupon the resulting residue is recrystallized from methanol. The melting point of the thus obtained 1,4-dimethyl-2(α-hydroxybenzhydryl) - piperazine is 121°–123° C.

Similar methylation of the ether N,N'-unsubstituted piperazine derivatives, described in Example 4, gives the following substances:

1,3,4-trimethyl-2-(α-hydroxybenzhydryl)-piperazine - dihydrochloride, M.P. 171°–176° C., 3-ethyl-1,4-dimethyl-2(α - hydroxybenzhydryl) - piperazine-dihydrochloride, M.P. 195°–197° C., 1,4-dimethyl-2-(α-hydroxy-α-p-chlorophenyl) - benzyl-piperazine, M.P. 171°–173° C., 1,4-dimethyl-2-(α-hydroxy - α - p-fluorophenyl)-benzylpiperazine, M.P. 134°–136° C.

We claim:
A compound of the formula:

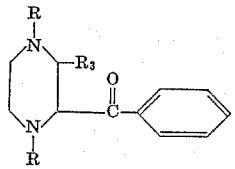

in which R is selected from the group consisting of hydrogen, benzyl and methyl, and R₃ is selected from the group consisting of hydrogen, methyl and ethyl.

References Cited

UNITED STATES PATENTS 2,958,693  11/1960  Phillips _____ 260—268
3,056,786  10/1962  Phillips _____ 260—268

OTHER REFERENCES

Elderfield, Heterocyclic Chemistry, volume 6, pages 423–26 (1957).

Jucker et al., Helvetica Chimica Acta, volume 45 (1962), pages 2383–86 and 2396–98.

Zaugg et al., J. Amer. Chem. Soc., volume 80 (1958), 2773–74.

H. R. JILES, *Primary Examiner.*

ALEX MAZEL, *Examiner.*